Aug. 15, 1950      J. M. MARKEL      2,518,802
LIME SPREADER

Filed Jan. 9, 1946      2 Sheets—Sheet 1

Inventor
John M. Markel

Aug. 15, 1950  J. M. MARKEL  2,518,802
LIME SPREADER

Filed Jan. 9, 1946  2 Sheets-Sheet 2

Inventor:
John M. Markel
By Thiess, Olson & Mecklenburger
Attys

Patented Aug. 15, 1950

2,518,802

UNITED STATES PATENT OFFICE 2,518,802

LIME SPREADER

John M. Markel, Rockford, Ill., assignor to J. I. Case Company, Racine, Wis., a corporation of Wisconsin Application January 9, 1946, Serial No. 640,004

7 Claims. (Cl. 275—6)

My invention relates to lime spreaders for fertilizers such as lime or the like. More particularly, my invention is concerned with improvements in lime spreaders combined with manure spreader equipment.

An ordinary form of manure spreader comprises a spreader box mounted on a wagon. This box extends from the front of the wagon to the point in the rear where the lime spreader is mounted. The spreader box is equipped with a chain raddle type conveyor wherein chains are placed along each of the longitudinal sides of the spreader box. These chains are equipped with slats or angle irons which extend transversely over the spreader box floor. The conveyor is commonly actuated by means of a sprocket wheel device which in turn is operated by the rear wheels of the spreader. As the material is fed from the front to the rear of the wagon by means of the angles of the conveyor, it is thereby brought in contact with a beater. This beater in the case of a manure spreader may comprise a cage rotatable about a transverse horizontal axis which delivers the material to a widespread or distributing rotor. The beater and the distributor may be driven from the rear wheels of the spreader in a manner well known to the art. The beater cage may be provided with cross bars which in turn are provided with radially projecting teeth which dig into the rearwardly moving mass of material, tear it apart and deliver it to the widespread. The radially projecting teeth of the latter are positioned with respect to the delivery end of the conveyor in such a manner as to leave a space between the adjacent slats of the conveyor and the teeth of the beater. In a manure spreader the beater is usually positioned to the rear and adjacent the delivery end of the conveyor in such a manner that the material coming from the conveyor is taken up by the beater and, in view of the stringy fibrous nature of the material, no appreciable quantity escapes between the conveyor and the beater.

The physical action of ground or pulverized lime is entirely different from that of manure material, and in view of this difference in physical properties it is necessary to devise means of avoiding lime spillage at the point between the end of the conveyor and the beater. I have also found that the fineness and dispersed form of the lime makes it necessary to provide a means of preventing substantial portions of this finely powdered lime from falling through a rotating beater to the ground without being acted upon by the widespread. In the past, this has been done by providing a pan beneath the conveyor in which any spilled lime is caught and propelled a short distance toward the front of the machine by the returning run of the conveyor. The pan is perforated and the lime is dispersed through the perforations before it has traveled any great distance. The feed of lime to the beater is adjusted so as to spread the desired quantity, taking into account that which is so dispersed through the perforated pan. I have devised means for eliminating the need for a supporting apron or pan to be located at the bottom of the beater, and have devised means for obtaining highly efficient feeding of lime to a beater with a minimum of lime loss.

One of the objects of my invention, therefore, is to provide an efficient and direct lime feed to the lime beater attachment of a manure spreader vehicle.

Another object of my invention is to avoid loss of lime between the lime feeder and the lime beater.

Still another object of my invention is to avoid lime spillage caused by the dropping down of lime on the ground directly below the beater.

Still another object of my invention is to eliminate the need for an apron pan underneath the beater between the end of the conveyor and the space directly under the beater.

Other objects of my invention will become apparent upon the examination of the specification and claims.

Referring now to the drawings.

Figure 1:
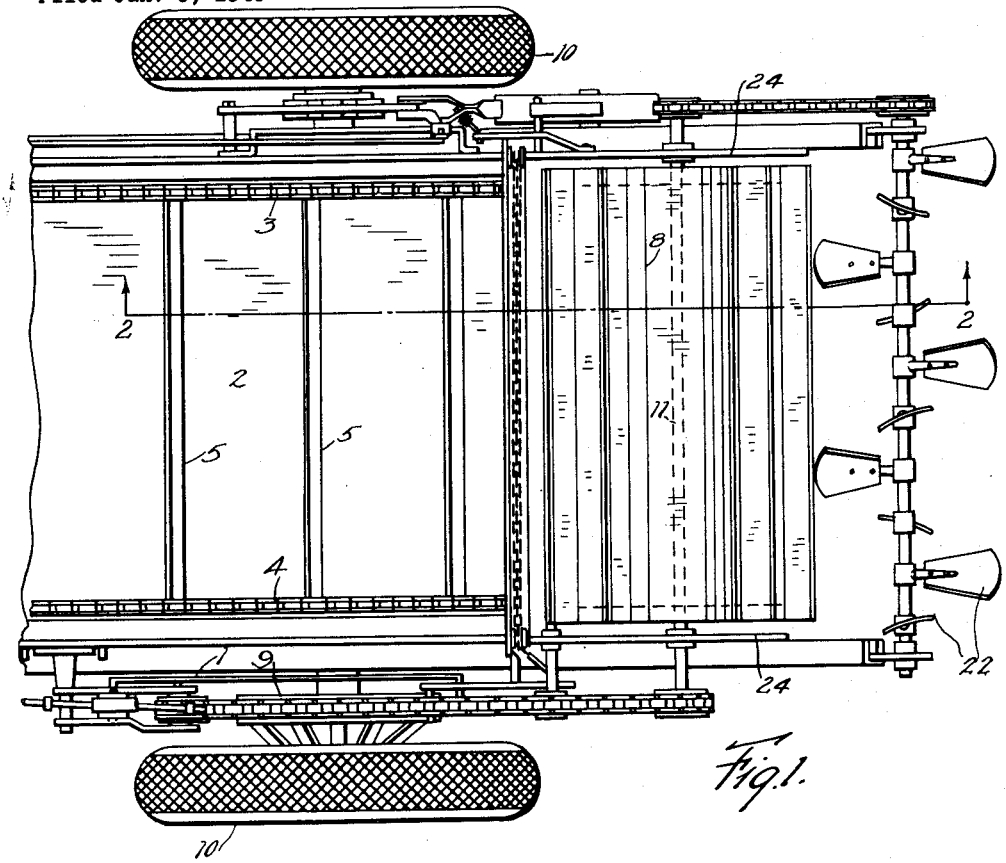
Fig. 1 is a plan view of a lime spreader embodying my invention.

Referring now to the drawings, the construction shown comprises a spreader box 1 mounted on the wagon-body 2. Extending along each longitudinal side of the spreader box are the chain conveyors 3 and 4. At suitably spaced intervals in the conveyor chain there are provided angle iron slats 5 connecting the two chains 3 and 4. The chains may be driven by any usual step-by-step variable speed transmission from the rear wheels of the manure spreader. An example of a satisfactory drive mechanism is that described in the Hendricks et al. United States Patent No. 2,094,572.

The rear end of the conveyor extends into close proximity to a rotating beater 8. This beater is driven from the main sprocket wheel 9 which is attached to the rear wheel 10 through a chain device in a manner similar to that described in the above patent to Hendricks et al. The rotating beater 8 consists of a rotatable shaft 11 upon which there are mounted, by means of spiders, the beater paddles 12 which in turn are mounted on the bars 13. The paddles 12 have portions 14 which serve to close the space between the adjacent bars 13, thereby forming a rotary beater having a completely enclosed inner drum.

This closed inner drum prevents lime material from dropping through open spaces in the beater down to the ground. The outer tips 15 of the beater paddles 12 are mounted so as to be contiguous to the hinged spring flap extension 16 which is attached to the spreader box 1 by means of the hinges 17. Coil torsion springs 18 are provided which normally hold the spring flap 16 in horizontal position. The purpose of the hinged spring flap extension of the horizontal spreader box floor being within close proximity or contiguous to the beater paddles is to prevent any lime from dropping or spilling in the open space between the end of the spreader box floor and the beater paddles 12.

Figure 3:
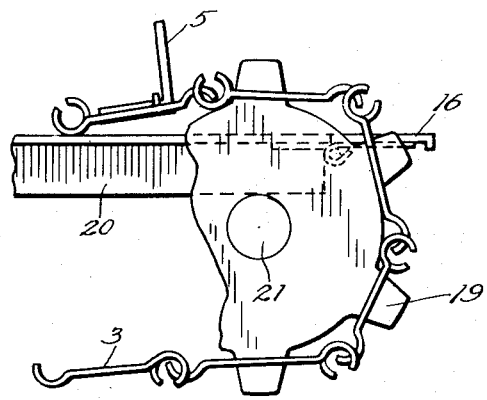
Fig. 3 is a side detailed view of the raddle chain conveyor and the spring flap attached to the spreader box bottom just as the apron angle is ready to start its return motion.
Figure 4:
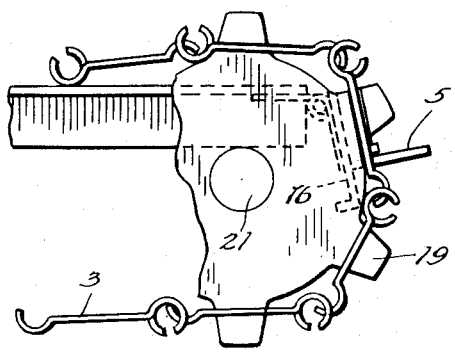
Fig. 4 is a side detailed view of the raddle chain conveyor showing the spring flap going over the edge of the conveyor on its return, and showing how the spring flap avoids obstructing the return of the raddle chain's apron angle.
Figure 6:
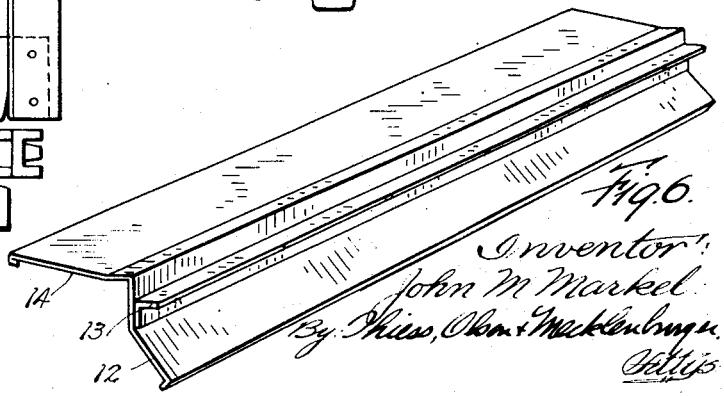
Fig. 6 is a perspective view of certain parts indicated in Fig. 2.

Referring now to Fig. 3, which shows in side view details of the conveyor and the spring flap, it is apparent that the slat 5, which is ready to return with the raddle chain 3, would be obstructed by the spreader box floor 20 if the latter were to extend substantially beyond the sprocket's axis center point 21. In order to avoid this obstruction and at the same time enable the spreader box floor 20 to extend to within close proximity of the beater paddles 12, the floor is extended by means of the spring flap 16 which is really a floor extension connected to the end of the main floor by means of the hinges 17. When the slat 5 of the conveyor begins to move about the axis of the sprocket 19, it comes in contact with the spring flap 16 and causes the latter to swing down on its hinges and assume a vertical position, thereby avoiding obstructing the path and return motion of the slat. As soon as the slat has passed, the springs 18 cause the flap to go back immediately to its horizontal position. The time consumed during the interval between the passage of the slat and the downward and upward motion of the spring flap is so short that any possible loss of lime caused by dropping of lime through this space during this momentary opening is insignificant. It is to be noted that during the interval that flap 16 is held down by slat 5, escape of lime is substantially prevented by the presence of slat 5 in the resulting opening.

Up until now I have described two means for minimizing and preventing lime losses and lime spillage at the two points in a lime spreader where such lime loss commonly takes place. There is still another point in a lime spreader where lime losses are apt to take place. This is at the point directly in front and above the rotating beater. Lime in powdered pulverized form is apt to be very dusty and fluffy, and the beating action of rapidly rotating beater paddles naturally tends to throw such dispersed material into the air with resultant losses in the form of lime dust dispersing and being thrown into paths away from that for which the beater is intended to direct it, namely, to the widespread 22 mounted next to the beater. By mounting an arched or curved deflecting surface, such as the curved metal sheet surface shown as 23, such lime losses are eliminated and any lime dust tending to escape is deflected back to the rotating beater.

By having the combined features of a closed beater drum, an arched metal surface deflecting any lime dust thrown up in front or on top of the rotating beater and the floor extension in the form of a spring flap extending from the end of the spreader box floor at the rear apron shaft axis to within a position contiguous to the outer fringes of the beater paddles, I create a lime feeding and lime dispersing system for agricultural lime spreading purposes which operates with a minimum of lime loss and lime spillage.

Figure 2:
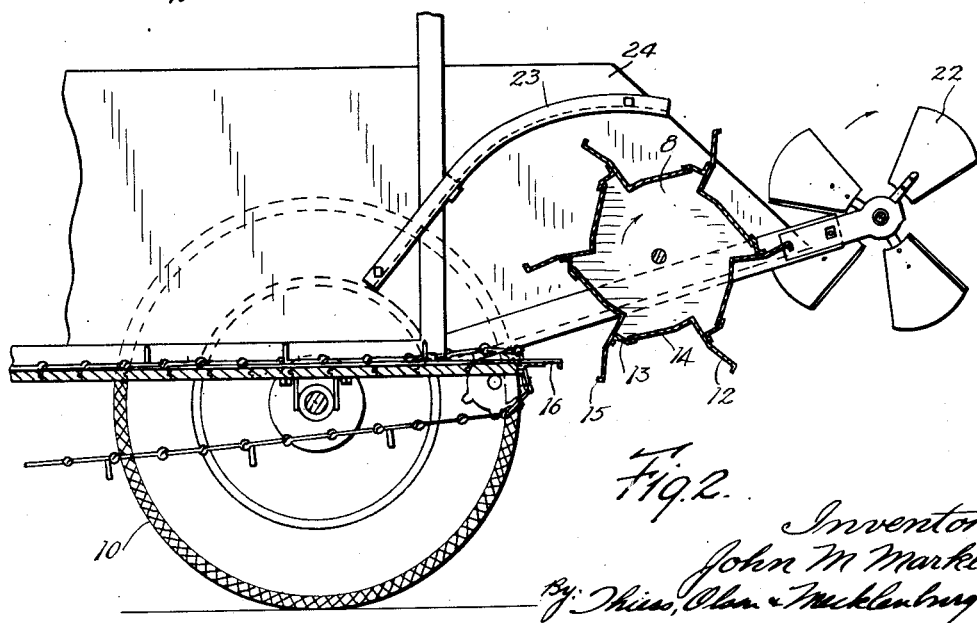
Fig. 2 is a side sectional view on the line 2—2 of Fig. 1 of the improved beater, the lime spreader, and the means for preventing lime spillage between the path of the beater paddles and the end of the conveyor.
Figure 5:
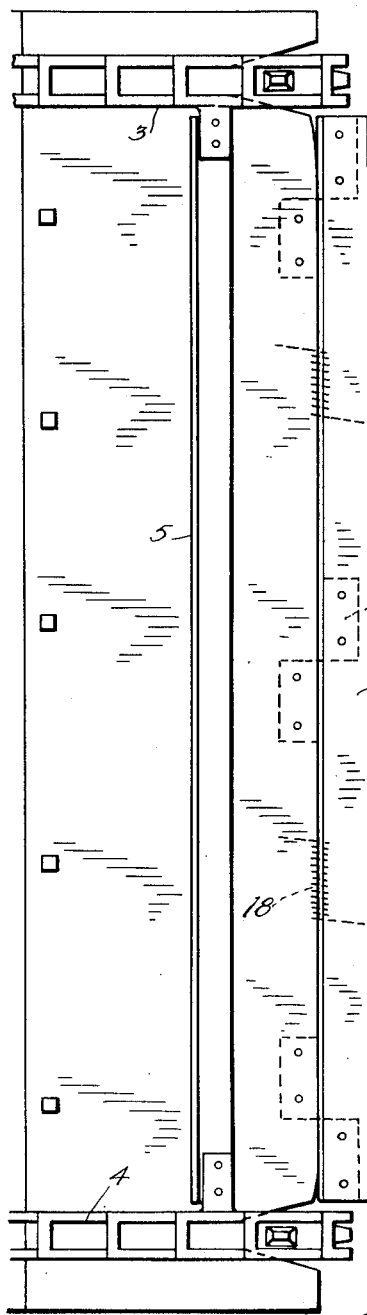
Fig. 5 is a top view of the raddle chain conveyor and the spring flap.

In operation, lime at the front of the spreader box 1 which rests on the spreader box floor 20 is moved towards the rear of the apron box by means of the slats 5 mounted on the conveyor chains 3 and 4. As the lime reaches the end of the spreader box floor, it continues to move rearwardly on the spring flap attached to the floor and is finally picked up by the rotating beater paddles 12. As the lime is lifted by the rotating beater 8, any lime dust formed is directed by the curved deflecting sheet 23 which extends from the front to the top of the beater 8 and is delivered to the wide spread rotor 22, the sides of the spreader extending rearwardly adjacent the ends of the paddles 12 as shown at 24 (Figs. 1 and 2) to prevent the lime caught up in the channels formed by the blades from falling out at the ends of the channels. The lifted lime from the beater 8 is then fed or thrown to the lime spreader 22. The latter then operates in the usual manner to spread pulverized lime over a wide area of earth as the spreader moves forward. Any lime which gets onto the rotating beater 8 but does not succeed in being lifted by the paddles 12 falls back to the spreader box bottom or to the hinged shelf extension spring flap 16, but substantially no lime falls down through the spreader box shelf to be lost in the ground underneath. It will be seen that the pulverized lime is substantially confined on all sides in its passage from the bottom of the spreader box to its delivery to the wide spreader rotor 22 between the curved deflecting sheet 23 and the hollow drum beater 8 and between the extension 24 of the spreader box.

By means of my improvements it is not necessary to have any apron or pan below the lime beater 8 to catch spilled lime nor to have means for dispersing this spilled lime beneath the spreader box. This means a considerable saving in metal that would be used for such apron attachment.

While I have described particular means for obtaining efficient lime feeding and lime spreading with a minimum of lime loss or lime spillage, I do not limit myself to such specific means. It is obvious that other equivalent means may be used to carry out the spirit of this invention.

I claim:

1. In a lime spreader of the character described the combination comprising a rotating beater equipped with beater paddles, a rotating spreader for receiving the lime from the beater, means for feeding lime to said rotating beater comprising the combination of a spreader box having a floor extending horizontally from the forward to the rearward end of said spreader box, an endless conveyor having a pair of spaced flexible endless members and spaced feed slats extending between said members for delivering lime to said beater, and means for avoiding lime spillage between the end of said conveyor and said rotating beater, said means comprising a hinge-attached floor extension extending from the edge of the spreader-box floor and contiguous to the path of the beater's rotating paddles, said floor extension being in the path of the slats which cause it to move out of the way as the slats move about the rear axis of the conveyor to a vertical non-obstructive position, and spring means for returning said hinged floor extension after disengagement by said slats.

2. A spreader for lime or the like comprising a lime receptacle, an endless conveyor, one run of which travels over the floor of said receptacle, said conveyor comprising a pair of spaced flexible endless members and spaced feed slats extending between and secured to said endless members, a hinged floor extension member movably mounted adjacent the rear end of said conveyor in the path of said slats and engaged by said slats in their movement and moved out of the path of said slats by said slats, energy storing biasing means for returning said floor extension to floor-extending position when disengaged by said slats, and a rotary beater to which said conveyor delivers the lime, said floor extension extending to a position adjacent the path of said rotary beater.

3. A spreader for lime or the like comprising a lime receptacle, a conveyor, one run of which travels over the floor of said receptacle, a rotary beater to which said conveyor delivers the lime, a widespread rotor to which the beater delivers the lime, baffle and shield means extending in front of and above said beater for regulating the feed from the conveyor and deflecting the lime expelled from the beater toward the widespread rotor, said beater comprising a hollow cylinder-like transversely-extending shell member in the rear of the conveyor having a plurality of transversely and radially extending paddles for carrying the lime upwardly from the conveyor and between the baffle and shield means, said paddles extending substantially from one end to the other of said shell and being of substantially uniform cross section, said shell member and paddles being substantially impervious to the passage of lime therethrough and therebetween whereby substantially all of the lime fed rearwardly by the conveyor to the rotary beater is carried upwardly and rearwardly by the paddles and shell member underneath said baffle and shield means and delivered to said widespread rotor.

4. A spreader for lime or the like comprising a lime receptacle, a conveyor, one run of which travels over the floor of said receptacle, a rotary beater to which said conveyor delivers the lime, a widespread rotor to which the beater delivers the lime, baffle and shield means extending in front of and above said beater for regulating the feed from the conveyor and deflecting the lime expelled from the beater toward the widespread rotor, said beater comprising a hollow cylinder-like transversely-extending shell member in the rear of the conveyor having a plurality of transversely and radially extending paddles for carrying the lime upwardly from the conveyor and between the baffle and shield means, said shell member comprising a pair of end spiders, a plurality of transversely-extending circumferentially-spaced angle irons extending between and secured to said spiders, each angle iron having one leg extending circumferentially and the other extending radially, said paddles being secured to said radially extending legs, said paddles extending substantially from one end to the other of said shell and being of substantially uniform cross section, said shell member and paddles being substantially impervious to the passage of lime therethrough and therebetween whereby substantially all of the lime fed rearwardly by the conveyor to the rotary beater is carried upwardly and rearwardly by the paddles and shell member underneath said baffle and shield means and delivered to said widespread rotor.

5. A spreader for lime or the like comprising a lime receptacle, a conveyor, one run of which travels over the floor of said receptacle, a rotary beater to which said conveyor delivers the lime, a widespread rotor to which the beater delivers the lime, baffle and shield means extending in front of and above said beater for regulating the feed from the conveyor and deflecting the lime expelled from the beater toward the widespread rotor, said beater comprising a hollow cylinder-like transversely-extending shell member in the rear of the conveyor having a plurality of transversely and radially extending paddles for carrying the lime upwardly from the conveyor and between the baffle and shield means, said shell member comprising a pair of end spiders, a plurality of transversely-extending circumferentially-spaced angle irons extending between and secured to said spiders, each angle iron having one leg extending circumferentially and the other extending radially, said paddles being secured to said radially extending legs, and the space between adjacent angle irons being bridged by sheet metal elements, said paddles extending substantially from one end to the other of said shell and being of substantially uniform cross section, said shell member and paddles being substantially impervious to the passage of lime therethrough and therebetween whereby substantially all of the lime fed rearwardly by the conveyor to the rotary beater is carried upwardly and rearwardly by the paddles and shell member underneath said baffle and shield means and delivered to said widespread rotor.

6. A spreader for lime or the like comprising a lime receptacle, a conveyor, one run of which travels over the floor of said receptacle, a rotary beater to which said conveyor delivers the lime, a widespread rotor to which the beater delivers the lime, baffle and shield means extending in front of and above said beater for regulating the feed from the conveyor and deflecting the lime expelled from the beater toward the widespread rotor, said beater comprising a hollow cylinder-like transversely-extending shell member in the rear of the conveyor having a plurality of transversely and radially extending paddles for carrying the lime upwardly from the conveyor and between the baffle and shield means, said shell member comprising a pair of end spiders, a plurality of transversely-extending circumferentially-spaced angle irons extending between and secured to said spiders, each angle iron having one leg extending circumferentially and the other extending radially, said paddles being secured to said radially extending legs, the space between adjacent angle irons being bridged by sheet metal elements, and the advance edge of each sheet metal element being offset outwardly with respect to the angle of the angle iron, said paddles extending substantially from one end to the other of said shell and being of substantially uniform cross section, said shell member and paddles being substantially impervious to the passage of lime therethrough and therebetween whereby substantially all of the lime fed rearwardly by the conveyor to the rotary beater is carried upwardly and rearwardly by the paddles and shell member underneath said baffle and shield means and delivered to said widespread rotor.

7. A material spreader for carrying and distributing material over the ground comprising a material receptacle having a floor extending from front to rear, an endless conveyor, one run of which travels over the floor of said receptacle, said conveyor comprising a pair of spaced flexible endless members and spaced feed slats extending between and secured to said endless members, a hinged floor extension member movably mounted adjacent the rear end of said conveyor in the path of said slats and engaged by said slats in their movement and moved out of the path of said slats by said slats, and energy storing biasing means for returning said floor extension to floor-extending position when disengaged by said slats.

JOHN M. MARKEL.

REFERENCES CITED

The following references are of record in the file of this patent:

UNITED STATES PATENTS

| Number | Name | Date |
|---|---|---|
| 1,282,854 | Kemp | Oct. 29, 1918 |
| 1,820,528 | Claar | Aug. 25, 1931 |
| 1,856,417 | Hyland | May 3, 1932 |
| 1,900,299 | Oppenheim | Mar. 7, 1933 |
| 2,094,572 | Hendricks et al. | Sept. 28, 1937 |